(12) United States Patent
Schoenek

(10) Patent No.: US 8,056,663 B2
(45) Date of Patent: Nov. 15, 2011

(54) HYBRID MODULE FOR INTERCONNECTING AN ENGINE AND A DUAL-CLUTCH TRANSMISSION

(75) Inventor: Norman Schoenek, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 365 days.

(21) Appl. No.: 12/483,526

(22) Filed: Jun. 12, 2009

(65) Prior Publication Data

US 2010/0314185 A1    Dec. 16, 2010

(51) Int. Cl.
*B60K 6/383* (2007.10)

(52) U.S. Cl. .................... 180/65.6; 180/65.22; 903/946; 477/5

(58) Field of Classification Search ............... 180/65.21, 180/65.22, 65.25, 65.265, 65.6; 903/912, 903/913, 914, 946; 477/2, 3, 5, 6; 192/3.51, 192/3.54, 3.55, 3.56
See application file for complete search history.

(56) References Cited

U.S. PATENT DOCUMENTS

| | | | | |
|---|---|---|---|---|
| 7,540,823 B2* | 6/2009 | Kilian et al. | | 477/3 |
| 7,559,864 B2* | 7/2009 | Maeda et al. | | 475/5 |
| 7,784,573 B2* | 8/2010 | Kluge et al. | | 180/65.22 |
| 2010/0317476 A1* | 12/2010 | Schoenek | | 475/5 |

* cited by examiner

*Primary Examiner* — John Walters
(74) *Attorney, Agent, or Firm* — Quinn Law Group, PLLC

(57) ABSTRACT

A hybrid module interconnects an engine and a dual-clutch transmission (DCT). The hybrid module includes a first carrier, a second carrier, and a first clutch. The first carrier is operatively connected to the DCT and is rotatable about the axis at a first rotational velocity. The second carrier is operatively connected to the engine and is rotatable about the axis at a second rotational velocity. The first clutch surrounds the axis and operatively interconnects the first carrier and the second carrier. The first clutch overruns such that they rotate independently when the first rotational velocity of the first carrier is less than the second rotational velocity of the second carrier. The first clutch also engages and locks rotation of the carriers when the second rotational velocity is equal to the first rotational velocity such that the second carrier drives the rotation of the first carrier about the axis.

16 Claims, 2 Drawing Sheets

HYBRID MODULE FOR INTERCONNECTING AN ENGINE AND A DUAL-CLUTCH TRANSMISSION

TECHNICAL FIELD

The present invention relates to a hybrid module that is configured to interconnect an engine and a dual-clutch transmission for a vehicle.

BACKGROUND OF THE INVENTION

In modern vehicles, multi-speed, dual-clutch transmissions (DCT) are generally utilized for their increased mechanical efficiency in comparison with typical, torque-converter equipped automatic transmissions. Additionally, multi-speed, dual-clutch transmissions are often preferred over typical automated manual transmissions for the DCT's capability to provide higher quality gear shifts.

A typical DCT employs two friction clutches for shifting among its forward ratios, and accomplishes such shifts by alternating engagement between one and the other of the two friction clutches. Such a multi-speed, dual-clutch transmission may be utilized in a hybrid vehicle, i.e. a vehicle employing two or more distinct power sources, such as an engine and an electric motor, for transmitting propulsion energy to subject vehicle's driven wheels. However, packaging of the DCT hardware along with the multiple power sources in a hybrid vehicle may pose a challenge.

SUMMARY OF THE INVENTION

A hybrid module is configured for interconnecting an engine and a dual-clutch transmission (DCT). The hybrid module includes a first carrier, a second carrier, an electric motor, and a first clutch. The first carrier is configured for being operatively connected to the DCT and is rotatable about the axis at a first rotational velocity. The electric motor is configured for rotation about the axis at the first rotational velocity. The first carrier is operatively connected to the electric motor for common rotation therewith such that the first rotational velocity of the first carrier is transferred to the DCT. The first carrier is configured for transferring the first rotational velocity of the first carrier to the DCT. The second carrier is configured for being operatively connected to the engine and is rotatable about the axis at a second rotational velocity. The first clutch surrounds the axis and operatively interconnects the first carrier and the second carrier. The first clutch is configured to overrun such that the first carrier rotates independent of the second carrier when the first rotational velocity of the first carrier is less than the second rotational velocity of the second carrier. The first clutch is also configured to engage and lock rotation of the first carrier to the second carrier when the second rotational velocity is generally equal to the first rotational velocity such that the second carrier drives the rotation of the first carrier about the axis.

Another embodiment of the invention includes a hybrid powertrain for propelling a vehicle. The hybrid powertrain includes an engine, a DCT, and a hybrid module. The hybrid module interconnects the engine and the DCT. The hybrid module includes a first carrier, a second carrier, an electric motor, and a first clutch. The first carrier is rotatable about the axis at a first rotational velocity. The electric motor is configured for rotation about the axis at the first rotational velocity. The first carrier is operatively connected to the electric motor for common rotation therewith such that the first rotational velocity of the first carrier is transferred to the DCT. The first carrier is rotatably connected to the DCT such that the first carrier drives rotation of the DCT. The second carrier is rotatably connected to the engine and is rotatable about the axis at a second rotational velocity. The first clutch surrounds the axis and operatively interconnects the first carrier and the second carrier. The first clutch is configured to overrun such that the first carrier rotates about the axis independent of the second carrier when the first rotational velocity of the first carrier is less than the second rotational velocity of the second carrier. The first clutch is also configured to engage and lock rotation of the first carrier to the second carrier when the second rotational velocity is generally equal to the first rotational velocity such that the second carrier drives the rotation of the first carrier about the axis.

Another aspect of the invention includes a method of operating a hybrid module to drive a DCT. The method includes operating an electric motor to rotate a first carrier and the DCT about an axis at a first rotational velocity. A second carrier and an output of the engine are rotated about the axis at a second rotational velocity. A first clutch that interconnects the first carrier and the second carrier is overrun when the first rotational velocity is less than the second rotational velocity such that only the first carrier is driving the DCT about the axis. The first clutch is engaged to lock the first carrier to the second carrier when the second rotational velocity is generally equal to the first rotational velocity such that the second carrier drives the rotation of the first carrier and the DCT about the axis.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
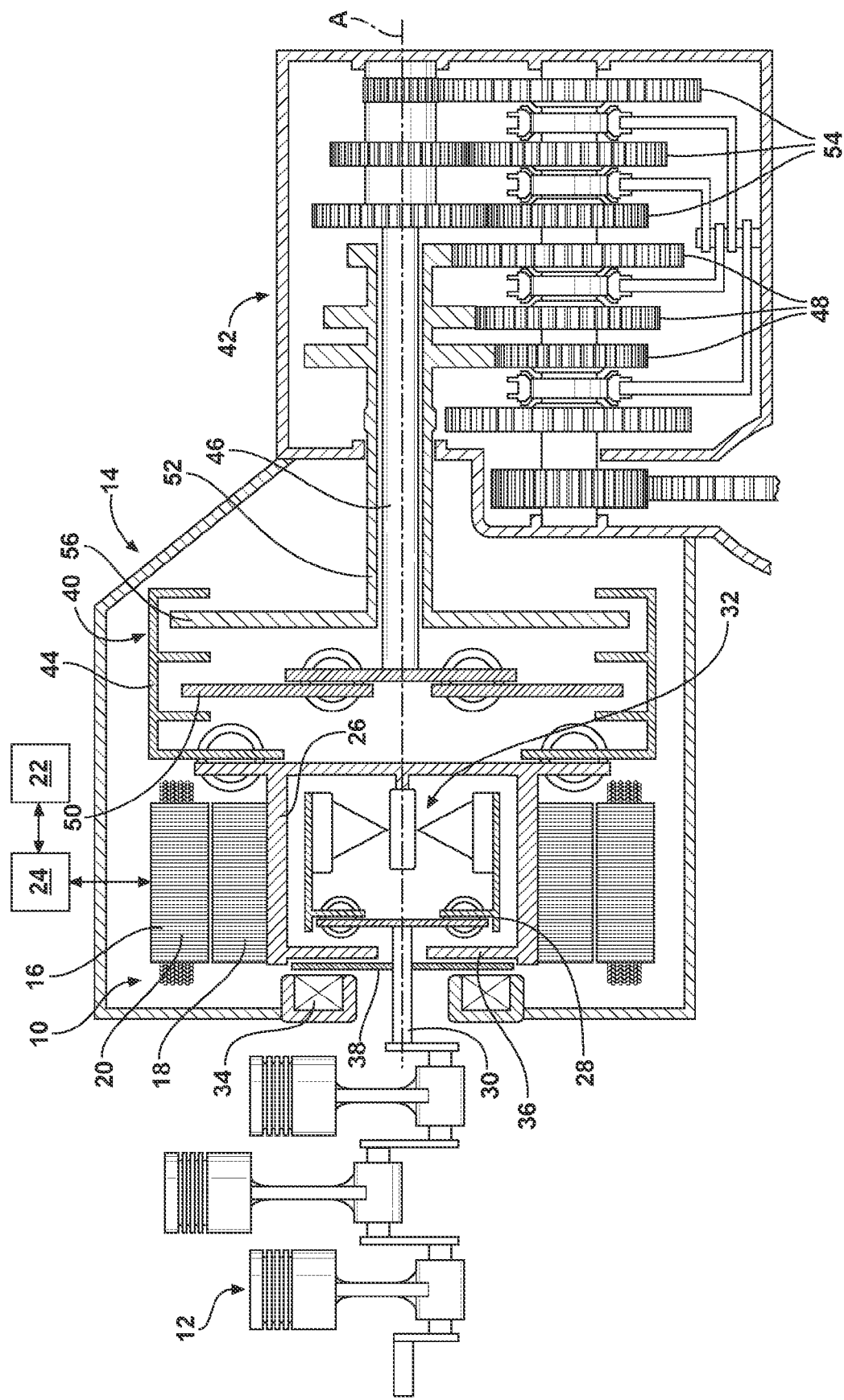
FIG. 1 is a schematic partial cross-sectional side view of a hybrid powertrain for propelling a vehicle.

Referring to the drawings, wherein like reference numbers refer to like components, FIG. 1 shows a hybrid module 10 interconnecting an engine 12 and a dual-clutch transmission 14 (DCT) to propel a vehicle (not shown). The hybrid module 10 includes an electric motor 16 that is rotatable about an axis A. The electric motor 16 includes a rotor 18 and a stator 20 that radially surrounds the rotor 18 about the axis A such that the rotor 18 rotates about the axis A, relative to the stator 20. It should be appreciated that other configurations of the electric motor 16 may be used as known to those skilled in the art. Additionally, the electric motor 16 is operatively connected to an energy storage device 22 and a controller 24, as will be described in more detail below.

Figure 2:
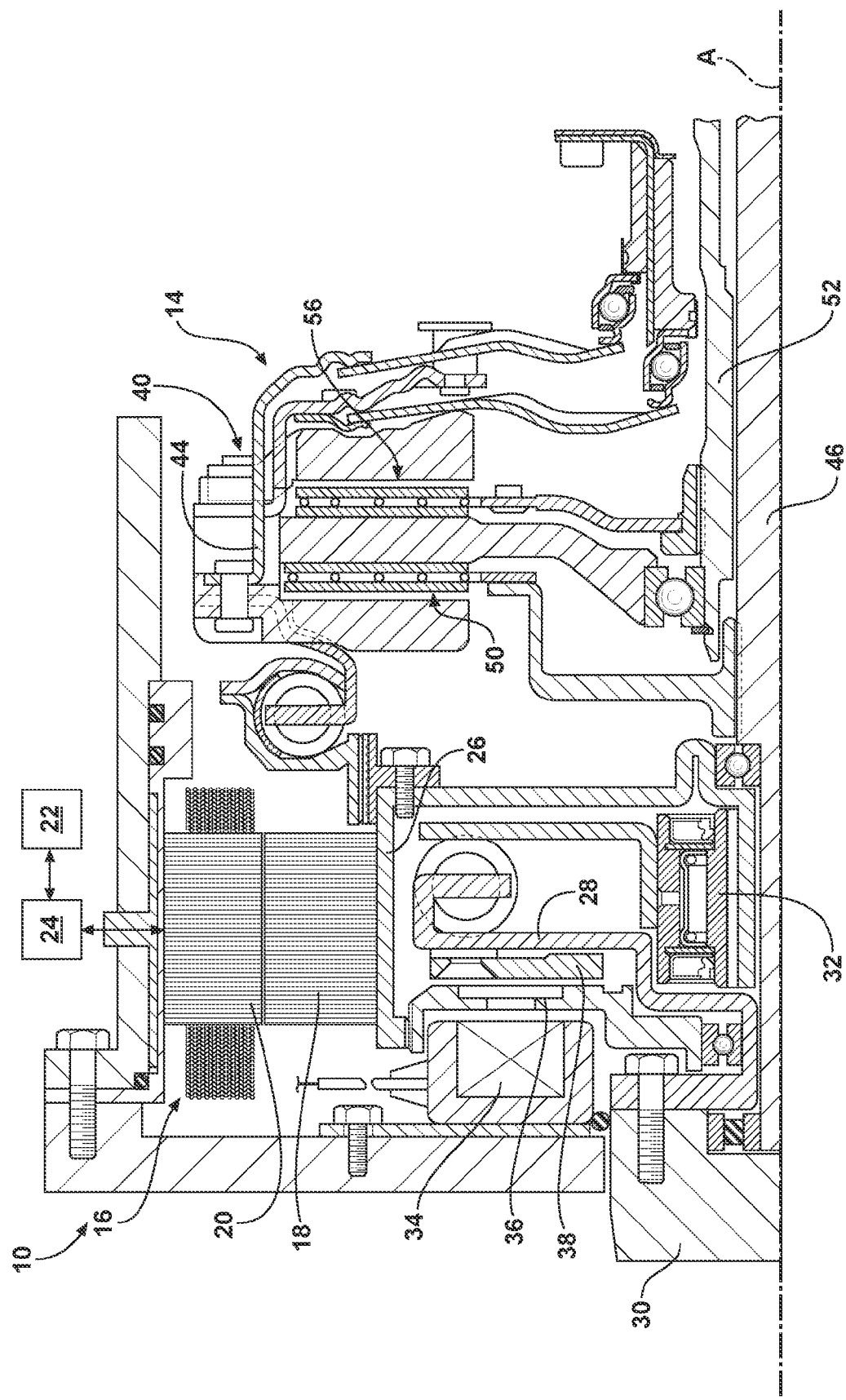
FIG. 2 is a schematic cross-sectional side view of a hybrid module and a dual-clutch assembly of the hybrid powertrain of FIG. 1.

Referring to FIGS. 1 and 2, the hybrid module 10 also includes a first carrier 26 and a second carrier 28. The first carrier 26 is operatively connected to the electric motor 16 and is rotatable about the axis A at a first rotational velocity. More specifically, the first carrier 26 is operatively connected to the rotor 18 such that the first carrier 26 and the second carrier 28 rotate about the axis A in unison. The second carrier 28 is operatively connected to an output 30 of the engine 12, such as an engine crank 30, and is rotatable about the axis A at a second rotational velocity.

Referring again to FIGS. 1 and 2, a first clutch 32 operatively interconnects the first carrier 26 and the second carrier 28 and may be positioned on the axis A. The first clutch 32 is a one-way clutch that surrounds the axis A, such as a sprag clutch or any other one-way clutch known to those skilled in the art. The first clutch 32 is configured to overrun when the first rotational velocity of the first carrier 26 is greater than the second rotational velocity of the first carrier 26. This means that the first carrier 26 is configured to rotate about the axis A independently of the second carrier 28. When the second rotational velocity of the second carrier 28 is at least equal to the first rotational velocity of the first carrier 26, the first clutch 32 is configured to engage and lock rotation of the first carrier 26 to the second carrier 28 about the axis A. When the first clutch 32 engages, rotation of the second carrier 28 drives the rotation of the first carrier 26 and the rotor 18 about the axis A. Therefore, when the first clutch 32 is engaged, the rotational velocity of the first carrier 26 is equal to the second rotational velocity of the second carrier 28.

Additionally, a second clutch 34 is disposed within the hybrid module 10 to selectively lock rotation of the first carrier 26 with rotation of the second carrier 28, as shown in FIGS. 1 and 2. The first carrier 26 includes at least one first clutch plate 36 and the second carrier 28 includes at least one second clutch plate 38 in opposition to the first clutch plate 36. The second clutch 34 may be axially disposed between the electric motor 16 and the engine 12. More specifically, the second clutch 34 may be axially disposed between each of the carriers 26, 28 and the engine 12. However, it should be appreciated that the second clutch 34 may be disposed in any other suitable location known to those skilled in the art. The second clutch 34 may be an electric clutch that is selectively activated. In one embodiment, the electric clutch is operable from a 12 volt power supply, such as a battery. It should be appreciated, however, that the electric clutch is not limited to operating off of a 12 volt power supply, as other voltages may be used as known to those skilled in the art. When the second clutch 34 is activated, a magnetic field is generated to bring the first clutch plate 36 into engagement with the second clutch plate 38. When the first and second clutch plates 36, 38 are in engagement with one another, the first carrier 26 is locked to the second carrier 28 such that the first carrier 26 and the second carrier 28 rotate about the axis A in unison. In the present embodiment, the second clutch 34 is configured to selectively activate and engage the first carrier 26 with the second carrier 28 when the first rotational velocity of the first carrier 26 is greater than the second rotational velocity of the first carrier 26. Accordingly, the first carrier 26 and the second carrier 28 rotate about the axis A in unison to transfer the first rotational velocity of the first carrier 26 to the engine crank 30 via engagement of the carriers 26, 28 to restart or accelerate an output of the engine 12. The second clutch 34 is not limited to being an electric clutch, as any other clutch known to those skilled in the art may also be used.

The DCT 14 is operatively connected to the first carrier 26 of the hybrid module 10. Referring to FIG. 1, the DCT 14 includes a dual-clutch assembly 40 and a gearbox 42. The dual-clutch assembly 40 includes a clutch carrier 44 that is operatively connected to the first carrier 26 of the hybrid module 10, as shown in FIGS. 1 and 2. The clutch carrier 44 is configured to rotate about the axis A in response to rotation of the first carrier 26 of the hybrid module 10. An inner transmission shaft 46 extends along the axis A and is operatively connected to a first set of gears 48 that are disposed within the gearbox 42. A first clutch assembly 50 is rotatably connected to the inner transmission shaft 46 such that the first clutch assembly 50 and the inner transmission shaft 46 rotate about the axis A in unison. An outer transmission shaft 52 extends about the inner transmission shaft 46, along the axis A. The outer transmission shaft 52 is operatively connected to a second set of gears 54 that are disposed within the gearbox 42. A second clutch assembly 56 is rotatably connected to the outer transmission shaft 52 such that the second clutch assembly 56 and the outer transmission shaft 52 rotate about the axis A in unison. The first clutch assembly 50 is selectively engageable with the clutch carrier 44 to rotate about the axis A and drive the first set of gears 48. Likewise, the second clutch assembly 56 is selectively engageable with the clutch carrier 44 to rotate about the axis A and drive the second set of gears 54. It should be appreciated that the DCT 14 may be configured as a manual transmission or an automatic transmission, as known to those skilled in the art. Alternatively, the shafts 52, 46 may be connected to either even or odd gear sets 48, 54, dependent on the overall DCT 14 architecture The selective engagement and disengagement of the first and second clutches 32, 34 means that the hybrid module 10 is configured to selectively operate off of the electric motor 16 and/or the engine 12. When the engine crank 30 of the engine 12 rotates the second carrier 28 at a second rotational velocity that is equal to the first rotational velocity of the first carrier 26 and rotor 18, the first clutch 32 engages such that the first carrier 26 and the rotor 18 are driven about the axis A by the second carrier 28. If a state of charge of the energy storage device 22 is below a threshold level, the controller 24 may operate as an inverter to transform this rotation of the rotor 18 into recharging the energy storage device 22 to a desired state of charge.

In another embodiment, both the electric motor 16 and the engine crank 30 of the engine 12 cooperate to drive the DCT 14. In this embodiment, first carrier 26 and the second carrier 28 are driven by the electric motor 16 and the engine 12, respectively, such that the first rotational velocity and the second rotational velocity are generally equal.

In yet another embodiment, only the electric motor 16 drives the DCT 14. In this embodiment, the rotor 18 of the electric motor 16 rotates the first carrier 26 about the axis A at a first rotational velocity that is less than the second rotational velocity of the first carrier 26. As the first carrier 26 rotates about the axis A, the first carrier 26 drives the DCT 14. The second clutch 34 may be activated to engage the second carrier 28 to start rotation of the crank 30 of the engine 12. In this embodiment, the second rotational velocity of the second carrier 28 and the engine crank 30 can therefore be increased to match the first rotational velocity of the first carrier 26 and the rotor 18 of the electric motor 16. This can allow the engine 12 to take over operation of the DCT 14 and, possibly recharge the energy storage device 22, as desired. Alternatively, the second clutch 34 may be activated when higher vehicle speeds are needed and the engine 12 is required to take over driving the DCT 14.

While the best modes for carrying out the invention have been described in detail, those familiar with the art to which this invention relates will recognize various alternative designs and embodiments for practicing the invention within the scope of the appended claims.

The invention claimed is:

1. A hybrid module configured for interconnecting an engine and a dual-clutch transmission, said hybrid module comprising:

a first carrier configured for being operatively connected to the dual-clutch transmission and rotatable about an axis at a first rotational velocity;

an electric motor configured for rotation about said axis at said first rotational velocity;

wherein said first carrier is operatively connected to said electric motor for common rotation therewith such that said first rotational velocity of said first carrier is transferred to the dual-clutch transmission;

a second carrier configured for being operatively connected to the engine and rotatable about said axis at a second rotational velocity;

a first clutch positioned on said axis and operatively interconnecting said first carrier and said second carrier;

wherein said first clutch is configured to overrun such that said first carrier rotates independent of said second carrier when said first rotational velocity of said first carrier is less than said second rotational velocity of said second carrier;

wherein said first clutch is configured to engage and lock rotation of said first carrier to said second carrier when said second rotational velocity is generally equal to said first rotational velocity such that said second carrier drives the rotation of said first carrier about said axis.

2. A hybrid module, as set forth in claim 1, wherein said second carrier is configured to rotate about said axis at said second rotational velocity in response to receiving an input from the engine.

3. A hybrid module, as set forth in claim 1, further comprising a second clutch operatively interconnecting said first carrier and said second carrier and configured to selectively activate to engage said first carrier with said second carrier when said first rotational velocity of said first carrier is greater than said second rotational velocity of said second carrier such that said first carrier drives the rotation of said second carrier about said axis.

4. A hybrid module, as set forth in claim 3, wherein said first carrier includes at least one first clutch plate and said second carrier includes at least one second clutch plate in spaced opposition to said first clutch plate;

wherein said second clutch is configured to selectively activate and bring said at least one first clutch plate into engagement with said at least one second clutch plate such that said first carrier is engaged with said second carrier.

5. A hybrid module, as set forth in claim 4, wherein said second clutch is an electric clutch.

6. A hybrid module, as set forth in claim 5, wherein said second clutch is axially disposed between each of said carriers and said engine.

7. A hybrid module, as set forth in claim 1, wherein said first clutch is a one-way clutch.

8. A hybrid module, as set forth in claim 1, wherein said electric motor includes a rotor and a stator radially surrounding said axis, wherein said rotor is configured to rotate about said axis, relative to said rotor;

wherein said first carrier is rotatably connected to said rotor about said axis and configured for transferring said first rotational velocity to the dual-clutch transmission.

9. A hybrid powertrain for propelling a vehicle, said hybrid powertrain comprising:

an engine;

a dual-clutch transmission;

a hybrid module interconnecting said engine and said dual-clutch transmission, said hybrid module including;

a first carrier rotatable about said axis at a first rotational velocity, an electric motor configured for rotation about said axis at said first rotational velocity;

wherein said first carrier is operatively connected to said electric motor for common rotation therewith such that said first rotational velocity of said first carrier is transferred to said dual-clutch transmission;

a second carrier rotatably connected to said engine and rotatable about said axis at a second rotational velocity, a first clutch surrounding said axis and operatively interconnecting said first carrier and said second carrier;

wherein said first clutch is configured to overrun such that said first carrier rotates about said axis independent of said second carrier when said first rotational velocity of said first carrier is less than said second rotational velocity of said second carrier;

wherein said first clutch is configured to engage and lock rotation of said first carrier to said second carrier when said second rotational velocity is generally equal to said first rotational velocity such that said second carrier drives the rotation of said first carrier about said axis.

10. A hybrid powertrain, as set forth in claim 9, wherein said dual-clutch transmission includes a dual-clutch assembly and a gearbox.

11. A hybrid powertrain, as set forth in claim 9, wherein said dual-clutch assembly includes:

a clutch carrier operatively connected to said first carrier and configured for rotation about said axis at said first rotational velocity in response to said first carrier rotating about said axis at said first rotational velocity;

an inner transmission shaft extending along said axis and operatively connected to a first set of gears;

a first clutch assembly rotatably connected to said inner transmission shaft;

an outer transmission shaft extending about said inner transmission shaft, along said axis, and operatively connected to a second set of gears;

a second clutch assembly rotatably connected to said outer transmission shaft;

wherein said first clutch assembly is configured for being selectively connected with said clutch carrier to rotate about said axis at said first rotational velocity when said first clutch assembly is engaged with said clutch carrier to drive said first set of gears;

wherein said second clutch assembly is configured for being selectively connected with said clutch carrier to rotate about said axis at said first rotational velocity when said second clutch assembly is engaged with said clutch carrier to drive said second set of gears.

12. A hybrid powertrain, as set forth in claim 9, further comprising a second clutch operatively connected to said first carrier and said second carrier and configured to selectively activate and engage said first carrier with said second carrier when said first rotational velocity of said first carrier is greater than said second rotational velocity of said second carrier such that said first carrier drives the rotation of said second carrier about said axis.

13. A hybrid powertrain, as set forth in claim 12, wherein said second clutch is an electric clutch.

14. A hybrid powertrain, as set forth in claim 12, wherein said second clutch is axially disposed along said axis between each of said carriers and said engine.

15. A method of operating a hybrid module to drive a dual-clutch transmission, said method comprising:

operating an electric motor to rotate a first carrier and the dual-clutch transmission about an axis at a first rotational velocity;

rotating a second carrier and an output of the engine about the axis at a second rotational velocity;

overrunning a first clutch that interconnects the first carrier and the second carrier when the first rotational velocity is less than the second rotational velocity such that only the first carrier is driving the dual-clutch transmission about the axis;

engaging the first clutch to lock the first carrier to the second carrier when the second rotational velocity is generally equal to the first rotational velocity such that the second carrier drives the rotation of the first carrier and the dual-clutch transmission about the axis.

16. A method of operating a hybrid module, as set forth in claim 15, further comprising:

selectively activating a second clutch to engage the first carrier with the second carrier such that the first carrier drives rotation of the second carrier and the dual-clutch transmission about the axis.

* * * * *